(12) United States Patent
Goto et al.

(10) Patent No.: US 7,834,291 B2
(45) Date of Patent: Nov. 16, 2010

(54) ELECTRODE FOR ELECTRIC DISCHARGE SURFACE TREATMENT, AND METHOD AND APPARATUS FOR ELECTRIC DISCHARGE SURFACE TREATMENT

(75) Inventors: Akihiro Goto, Tokyo (JP); Masao Akiyoshi, Tokyo (JP); Katsuhiro Matsuo, Aichi (JP); Hiroyuki Ochiai, Tokyo (JP); Mitsutoshi Watanabe, Tokyo (JP); Takashi Furukawa, Tokyo (JP)

(73) Assignees: Mitsubishi Denki Kabushiki Kaisha, Tokyo (JP); Ishikawajima-Harima Heavy Industries Co., Ltd., Tokyo (JP)

( * ) Notice: Subject to any disclaimer, the term of this patent is extended or adjusted under 35 U.S.C. 154(b) by 1347 days.

(21) Appl. No.: 11/266,392

(22) Filed: Nov. 4, 2005

(65) Prior Publication Data

US 2006/0118402 A1 Jun. 8, 2006

Related U.S. Application Data (63) Continuation-in-part of application No. PCT/JP2004/000731, filed on Jan. 28, 2004.

(30) Foreign Application Priority Data

May 29, 2003 (JP) ............................... 2003-152579

(51) Int. Cl.
*B23H 1/06* (2006.01)
*B05D 1/04* (2006.01)
(52) U.S. Cl. .................................. 219/69.15; 427/580
(58) Field of Classification Search ............. 219/69.15, 219/69.17, 76.13; 427/540, 580, 564
See application file for complete search history.

(56) References Cited

U.S. PATENT DOCUMENTS

| 6,441,333 | B1 * | 8/2002 | Goto et al. | ............... 219/69.15 |
| 7,537,808 | B2 * | 5/2009 | Goto et al. | .................. 427/580 |
| 2001/0014405 | A1 * | 8/2001 | Yuzawa et al. | .............. 427/564 |
| 2006/0021868 | A1 * | 2/2006 | Goto et al. | .................. 204/164 |

FOREIGN PATENT DOCUMENTS

CN 1322161 A 11/2001

(Continued)

OTHER PUBLICATIONS

Computer translation of Japan Patent No. 7-197,275, translation performed Mar. 2009.*

(Continued)

*Primary Examiner*—Geoffrey S Evans
(74) *Attorney, Agent, or Firm*—Sughrue Mion, PLLC (57) ABSTRACT

An electrode for electric discharge surface treatment is a green compact formed by molding a metal powder, a metal compound powder, or a ceramic powder, and is used for electric discharge surface treatment in which an electric discharge is generated between the electrode and a work in dielectric fluid or air to form by the electric discharge energy on a surface of the work a coat of a material of the electrode or of a substance resulting from reaction of the material due to the electric discharge energy. The material of the electrode includes a material not desired to be carbonized and a material desired to be melted, and a particle diameter of the material not desired to be carbonized is larger than a particle diameter of the material desired to be melted.

16 Claims, 6 Drawing Sheets

FOREIGN PATENT DOCUMENTS

| | | | |
|---|---|---|---|
| EP | 1 526 191 A1 | | 4/2005 |
| JP | 05-148615 A | | 6/1993 |
| JP | 7-70761 A | | 3/1995 |
| JP | 7-197275 A | | 8/1995 |
| JP | 8-300227 A | | 11/1996 |
| JP | 11-264080 A | * | 9/1999 |
| JP | 11-264080 A | | 9/1999 |
| JP | 2002-20882 A | | 1/2002 |
| JP | 2004-60013 A | | 2/2004 |
| WO | WO 99/046423 A1 | | 9/1999 |
| WO | WO 99/58744 A1 | | 11/1999 |
| WO | WO 01/05545 A1 | | 1/2001 |
| WO | 01-23641 A1 | | 4/2001 |
| WO | WO 01/23640 A1 | | 4/2001 |

OTHER PUBLICATIONS

Computer translation of Japan Patent No. 2002-20,882, translation performed Mar. 2009.*

Formation of hard layer on material by EDM, AkihiroGoto et al., Proc International Symposium for Electro-machining (ISEM 12) pp. 271-278.

Development of Electrical Discharge Coating Method, Akihiro Goto et al., Proc. International Symposium for Electro-machining (ISEM 13) pp. 581-588.

* cited by examiner

ELECTRODE FOR ELECTRIC DISCHARGE SURFACE TREATMENT, AND METHOD AND APPARATUS FOR ELECTRIC DISCHARGE SURFACE TREATMENT

This is a Continuation-in-Part Application of pending International Application No. PCT/JP2004/000731 filed Jan. 28, 2004. The entire disclosure of the prior application is hereby incorporated by reference.

BACKGROUND OF THE INVENTION

1) Field of the Invention

The present invention relates to an electrode for an electric discharge surface treatment, and method and apparatus for the electric discharge surface treatment.

2) Description of the Related Art

A turbine blade of a gas turbine engine for an aircraft, for example, requires, on its surface, a coating or hardfacing with a material having strength and a lubrication property under a high-temperature environment. Such materials having the strength and the lubrication property include Cr (chromium) and Mo (molybdenum) of which the lubrication property is obtained when Cr and Mo are oxidized under a high-temperature environment. Conventionally, a material containing Cr or Mo is used to form a thick coating through a scheme such as welding or thermal spraying. Here, welding is a scheme using an electric discharge between a work to be processed (hereinafter, work) on which a coating is to be formed and a welding rod to fuse and attach the material of the welding rod onto the work. Thermal spraying is a scheme of spraying a metal material in a melted state onto a work to form a coating.

However, welding and thermal spraying are both manual operations and require a high skill level. Therefore, it is difficult to perform such operations on a production line, disadvantageously leading to an increase in cost. Moreover, since welding in particular is a scheme in which heat enters a work in a concentrated manner, when a thin material is processed or when a material that is easy to be broken, such as a single-crystal alloy or directionally-controlled alloy including a uni-directionally-solidified alloy, is processed, weld cracking is prone to occur, thereby disadvantageously reducing yield.

On the other hand, as another exemplary surface treating technique different from such surface treating schemes as welding and thermal spraying in which a coating with strength and a lubrication property under a high-temperature environment is formed on a work, a surface treatment through electric discharge machining (hereinafter, electric discharge surface treatment) has been established (for example, refer to a first patent document). In forming a thick coating through this electric discharge surface treatment, what has the most influence on coating performance is supply of a material from an electrode side, melting of the supplied material on a work surface, and bonding of the supplied material with a work material. What has an influence on the supply of the electrode material is strength, that is, hardness, of the electrode. In the first patent document described above, with an electrode for electric discharge surface treatment being provided with hardness to some extent, supply of an electrode material through electric discharge is suppressed, and the supplied material is sufficiently melted to form a hard ceramic coating on a work surface. Such a technology is disclosed, for example, in International Publication No. 99/58744 Pamphlet (pp. 7-8).

However, there is a problem in achieving a surface treatment for forming a coating with strength and a lubrication property under a high-temperature environment by using electric discharge surface treatment. As described above, Cr or Mo has to be oxidized under a high-temperature environment to become an oxide. When the material supplied between poles from the electrode by discharge energy is sufficiently melted and is processed in dielectric fluid, such as oil, containing carbon, however, the material forming a carbide is transformed to a carbide. Here, examples of materials that prone to form a carbide are Ti (titanium), V (vanadium), Cr, Zr (zirconium), Nb (niobium), Mo, Hf (hafnium), Ta (tantalum), W (tungsten), Si (silicon), and B (boron). When an electric discharge surface treatment is performed by using an electrode containing powders of such materials, the materials are transformed to carbides. For example, Ti is transformed to titanium carbide, Cr is transformed to chromium carbide, and Mo is transformed to molybdenum carbide. A carbide is resistant to oxidation compared with a metal. For example, since chromium carbide is resistant to oxidation up to a high temperature of approximately 900 degrees Celsius, chromium carbide resists becoming an oxide under a high-temperature environment and, consequently, the lubrication property cannot be exhibit efficiently.

SUMMARY OF THE INVENTION

It is an object of the present invention to solve at least the above problems in the conventional technology.

An electrode for electric discharge surface treatment according to one aspect of the present invention is a green compact formed by molding a metal powder, a metal compound powder, or a ceramic powder, and is used for electric discharge surface treatment in which an electric discharge is generated between the electrode and a work in dielectric fluid or air to form by the electric discharge energy on a surface of the work a coat of a material of the electrode or of a substance resulting from reaction of the material due to the electric discharge energy. The material of the electrode includes a material not desired to be carbonized and a material desired to be melted, and a particle diameter of the material not desired to be carbonized is larger than a particle diameter of the material desired to be melted.

An electrode for electric discharge surface treatment according to another aspect of the present invention is a green compact formed by molding a metal powder, a metal compound powder, or a ceramic powder, and is used for electric discharge surface treatment in which an electric discharge is generated between the electrode and a work in dielectric fluid or air to form by the electric discharge energy on a surface of the work a coat of a material of the electrode or of a substance resulting from reaction of the material due to the electric discharge energy. The electrode includes a powder of a material not desired to be carbonized although the material can be carbonized and a material that is more prone to be carbonized than the material not desired to be carbonized.

An electrode for electric discharge surface treatment according to still another aspect of the present invention is a green compact formed by molding a metal powder, a metal compound powder, or a ceramic powder, and is used for electric discharge surface treatment in which an electric discharge is generated between the electrode and a work in dielectric fluid or air to form by the electric discharge energy on a surface of the work a coat of a material of the electrode or of a substance resulting from reaction of the material due to the electric discharge energy. The electrode includes a powder of a material not desired to be carbonized that is coated with a material that is more prone to be carbonized than the material not desired to be carbonized.

An electrode for electric discharge surface treatment according to still another aspect of the present invention is a green compact formed by molding a metal powder, a metal compound powder, or a ceramic powder, and is used for electric discharge surface treatment in which an electric discharge is generated between the electrode and a work in dielectric fluid or air to form by the electric discharge energy on a surface of the work a coat of a material of the electrode or of a substance resulting from reaction of the material due to the electric discharge energy. The electrode includes an alloy powder that is formed with a material not desired to be carbonized and a material that is less prone to be carbonized.

A method for electric discharge surface treatment according to still another aspect of the present invention in which an electrode being a green compact formed by molding a metal powder, a metal compound powder, or a ceramic powder is used, and an electric discharge is generated between the electrode and a work in dielectric fluid or air to form by the electric discharge energy on a surface of the work a coat of a material of the electrode or of a substance resulting from reaction of the material due to the electric discharge energy. The material of the electrode includes a material not desired to be carbonized and a material desired to be melted, and a particle diameter of the material not desired to be carbonized is larger than a particle diameter of the material desired to be melted.

A method for electric discharge surface treatment according to still another aspect of the present invention in which an electrode being a green compact formed by molding a metal powder, a metal compound powder, or a ceramic powder is used, and an electric discharge is generated between the electrode and a work in dielectric fluid or air to form by the electric discharge energy on a surface of the work a coat of a material of the electrode or of a substance resulting from reaction of the material due to the electric discharge energy. The electrode includes a powder of a material not desired to be carbonized although the material can be carbonized and a material that is more prone to be carbonized than the material not desired to be carbonized.

A method for electric discharge surface treatment according to still another aspect of the present invention in which an electrode being a green compact formed by molding a metal powder, a metal compound powder, or a ceramic powder is used, and an electric discharge is generated between the electrode and a work in dielectric fluid or air to form by the electric discharge energy on a surface of the work a coat of a material of the electrode or of a substance resulting from reaction of the material due to the electric discharge energy. The electrode includes a powder of a material not desired to be carbonized that is coated with a material that is more prone to be carbonized than the material not desired to be carbonized.

A method for electric discharge surface treatment according to still another aspect of the present invention in which an electrode being a green compact formed by molding a metal powder, a metal compound powder, or a ceramic powder is used, and an electric discharge is generated between the electrode and a work in dielectric fluid or air to form by the electric discharge energy on a surface of the work a coat of a material of the electrode or of a substance resulting from reaction of the material due to the electric discharge energy. The electrode includes an alloy powder that is formed with a material not desired to be carbonized and a material that is less prone to be carbonized.

An apparatus for electric discharge surface treatment according to still another aspect of the present invention in which an electrode being a green compact formed by molding a metal powder, a metal compound powder, or a ceramic powder and a work on which a coating is formed are arranged in dielectric fluid or air, and a power supply device electrically connected to the electrode and the work causes a pulsed electric discharge between the electrode and the work to form by the electric discharge energy on a surface of the work a coat of a material of the electrode or of a substance resulting from reaction of the material due to the electric discharge energy. The material of the electrode includes a material not desired to be carbonized and a material desired to be melted, and a particle diameter of the material not desired to be carbonized is larger than a particle diameter of the material desired to be melted.

An apparatus for electric discharge surface treatment according to still another aspect of the present invention in which an electrode being a green compact formed by molding a metal powder, a metal compound powder, or a ceramic powder and a work on which a coating is formed are arranged in dielectric fluid or air, and a power supply device electrically connected to the electrode and the work causes a pulsed electric discharge between the electrode and the work to form by the electric discharge energy on a surface of the work a coat of a material of the electrode or of a substance resulting from reaction of the material due to the electric discharge energy. The electrode includes a powder of a material not desired to be carbonized although the material can be carbonized and a material that is more prone to be carbonized than the material not desired to be carbonized.

An apparatus for electric discharge surface treatment according to still another aspect of the present invention in which an electrode being a green compact formed by molding a metal powder, a metal compound powder, or a ceramic powder and a work on which a coating is formed are arranged in dielectric fluid or air, and a power supply device electrically connected to the electrode and the work causes a pulsed electric discharge between the electrode and the work to form by the electric discharge energy on a surface of the work a coat of a material of the electrode or of a substance resulting from reaction of the material due to the electric discharge energy. The electrode includes a powder of a material not desired to be carbonized that is coated with a material that is more prone to be carbonized than the material not desired to be carbonized.

An apparatus for electric discharge surface treatment according to still another aspect of the present invention in which an electrode being a green compact formed by molding a metal powder, a metal compound powder, or a ceramic powder and a work on which a coating is formed are arranged in dielectric fluid or air, and a power supply device electrically connected to the electrode and the work causes a pulsed electric discharge between the electrode and the work to form by the electric discharge energy on a surface of the work a coat of a material of the electrode or of a substance resulting from reaction of the material due to the electric discharge energy. The electrode includes an alloy powder that is formed with a material not desired to be carbonized and a material that is less prone to be carbonized.

The other objects, features, and advantages of the present invention are specifically set forth in or will become apparent from the following detailed description of the invention when read in conjunction with the accompanying drawings.

DETAILED DESCRIPTION

Exemplary embodiments of an electrode for electric discharge surface treatment, and a method and an apparatus for electric discharge surface treatment according to the present invention will be explained below in detail with reference to the accompanying drawings. In the following description, an electrode for electric discharge surface treatment may also be simply referred to as an "electrode".

In the present invention, an electric discharge surface treatment to be used for achieving formation of a coating with a strength and lubrication property under a high-temperature environment is described. In the electric discharge surface treatment, the following 1 to 4 have become cleared with studies by the Inventors.

1. Electrode materials tend to melt in the order in which a material having a smaller particle diameter melts earlier. In particular, when a powder of a material having a small particle diameter (a particle diameter equal to or less than approximately 3 micrometers) is used as an electrode material, an evidence is observed in which the material is sufficiently melted when the material is transformed to be a coating on a work.

The reason for the above is thought to be as follows. Melting of a powder material is thought to be defined by a relation between a volume of the powder and thermal energy into the powder. While the surface area of the powder material is defined by the square of the particle diameter, the volume is defined by the cube of the particle diameter. As the particle is smaller, the powder gets larger thermal energy per unit volume. For a material to form a carbide, when the material is in a melted state, a chemical reaction is accelerated to proceed. In dielectric fluid, such as oil, containing carbon, the material becomes a carbide.

2. When a powder having a large particle diameter (a particle diameter equal to or larger than 6 micrometers) is used as an electrode material, many holes are present in a coating formed of the material on a work, and therefore it is difficult to make the coating dense. Thus, to make the coating dense, the particle diameter is preferably small to some extent.

3. In an electric discharge surface treatment in dielectric fluid, such as oil, containing carbon, even with a material forming a carbide being contained in the electrode, if another material that is more prone to form a carbide than the former material is contained in the electrode, the former material is less prone to be carbonized.

4. In an electric discharge surface treatment in dielectric fluid, such as oil, containing carbon, even with a material forming a carbide being contained in the electrode, if the material is contained not as a single powder but as a powder of an alloy with another metal, the material is less prone to be carbonized.

Based on the considerations described above, in the present invention, with a material not desired to be melted in an electric discharge surface treatment (for example, a material not desired to be carbonized because it is used to form a coating with a strength and lubrication property under a high-temperature environment) and a material desired to be melted therein (for example, a material that is more prone to form a carbide) being simultaneously present in an electrode material, the material desired to be melted is melted with a higher priority, while the material not desired to be melted is left as it is to become a component of a coating formed on a work.

Figure 1:
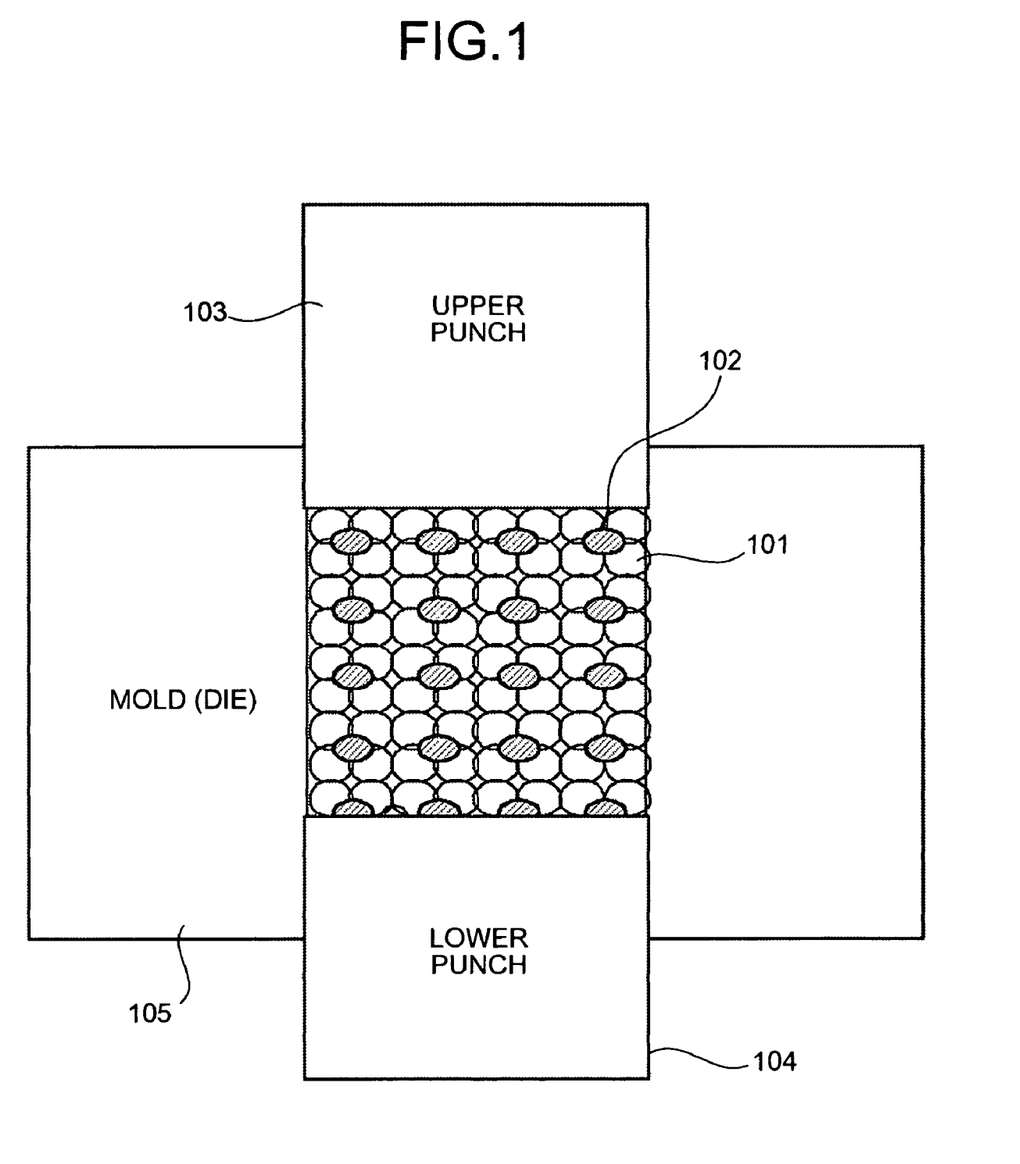
FIG. 1 is a cross-section of a molder for molding a powder.

In the first embodiment, an electric discharge surface treatment for forming a coating that contains Cr, which is not desired to be carbonized, on a work is exemplarily described. First, a scheme of manufacturing an electrode for electric discharge surface treatment for use in the first embodiment is described. FIG. 1 is a drawing schematically depicting a section shape of a molder for use in molding a powder. A lower punch 104 is inserted to a hole formed on a mold (die) 105 from its bottom. A space formed between these lower punch 104 and mold (die) 105 is filled with a mixture of a Cr powder 101, which is not desired to be carbonized, and a Co powder 102. The material forming a carbide is more prone to be carbonized when melted. Here, the particle diameter of the material not desired to be melted (carbonized) is preferably larger than 3 micrometers, while the particle diameter of the material desired to be melted is preferably smaller than 3 micrometers. In the first embodiment, 80 weigh percent of a Cr powder having a particle diameter on the order of 6 micrometers and 20 weight percent of a Co powder having a particle diameter on the order of 1 micrometer are mixed together. Then, an upper punch 103 is inserted into a hole formed on the mold (die) 105 from the top. To exert a predetermined pressure from both sides of the upper punch 103 and the lower punch 104 onto the molder filed with the mixture of a Cr powder and a Co powder in the manner as described above, a pressurizer is used for compression molding. With this, the powder is solidified to become a compact.

Here, when a Cr powder and a Co powder are mixed together, the order of 1 to 10 weight percent of wax, such as paraffin, may also be mixed. As such, if wax is mixed into the powder and then compression molding is performed, the pressure of the press is easily transferred to the inside of the powder at the time of pressing. Therefore, if wax is mixed in the powder, moldability can be improved. However, wax is an insulative material, and as the residual amount of wax in the electrode is larger, conductivity becomes deteriorated, thereby causing an electric discharge to become deteriorated. Therefore, when wax is mixed, this wax is preferably removed in a later process. An example of a scheme of removing wax is a scheme of putting a wax-contained compact formed through compression molding into a vacuum furnace for heating.

Also, the compact formed through compression molding can be directly used as an electrode for electric discharge surface treatment as long as the compact has a predetermined hardness provided through compression. By heating, the strength can be increased. Therefore, it is preferable, also in view of handling, that the compact be heated to have a hardness similar to that of chalk and then be used as an electrode for electric discharge surface treatment.

Figure 2:
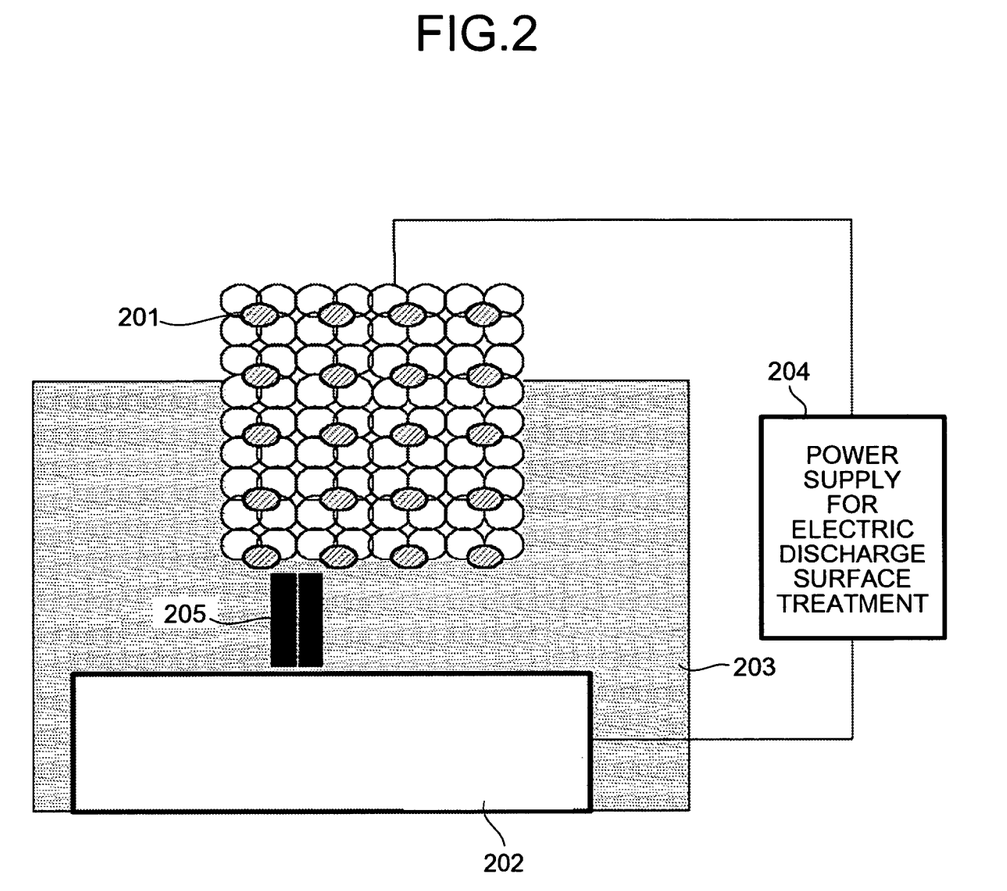
FIG. 2 is a schematic of an electric discharge surface treatment using an electrode for electric discharge surface treatment.

FIG. 2 is a drawing schematically depicting an electric discharge surface treatment using an electrode for electric discharge surface treatment manufactured through the process described above of a Cr powder (particle diameter of 6 micrometers) and a Co powder (particle diameter of 1 micrometer). In FIG. 2, dielectric fluid 203 is provided with a work 202 and an electrode for electric discharge surface treatment 201 formed of the compact of the Cr powder and Co powder described above, the electrode being opposed to a position on the work 202 where a coating is to be formed. Between these electrode for electric discharge surface treatment 201 and work 202, a power supply for electric discharge surface treatment 204 is connected. With a pulse voltage applied from the power supply for electric discharge surface treatment 204 between the electrode for electric discharge surface treatment 201 and the work 202, an arc column 205 is generated between the electrode for electric discharge surface treatment 201 and the work 202.

When a pulse-like electric discharge is caused to take place between the electrode for electric discharge surface treatment 201 and the work 202, with its discharge energy, the electrode material forming the electrode for electric discharge surface treatment 201 is melted to be released to the surface of the work 202. The electrical material is solidified on the surface of the work 202 to become a coating.

Figure 3A:
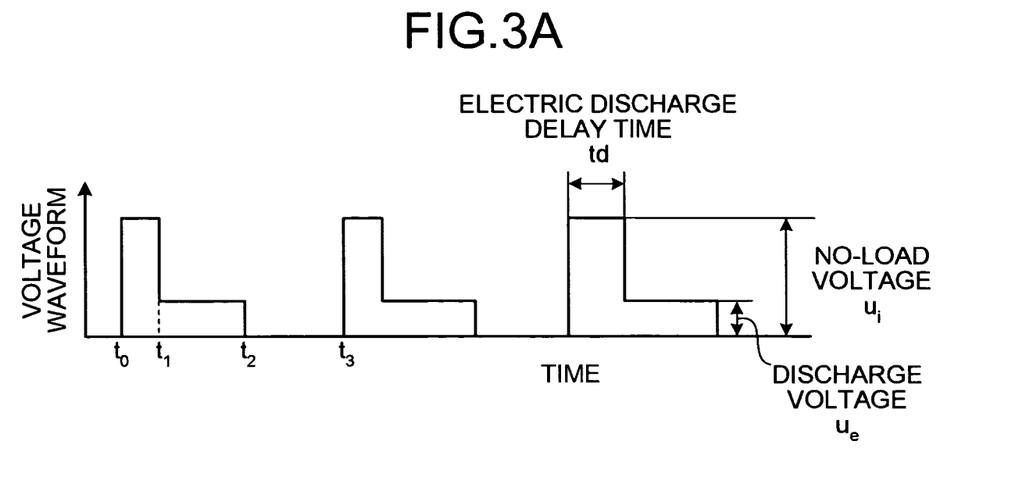
FIG. 3A is a plot of a waveform of a voltage applied between the electrode and a work during electric discharge.
Figure 3B:
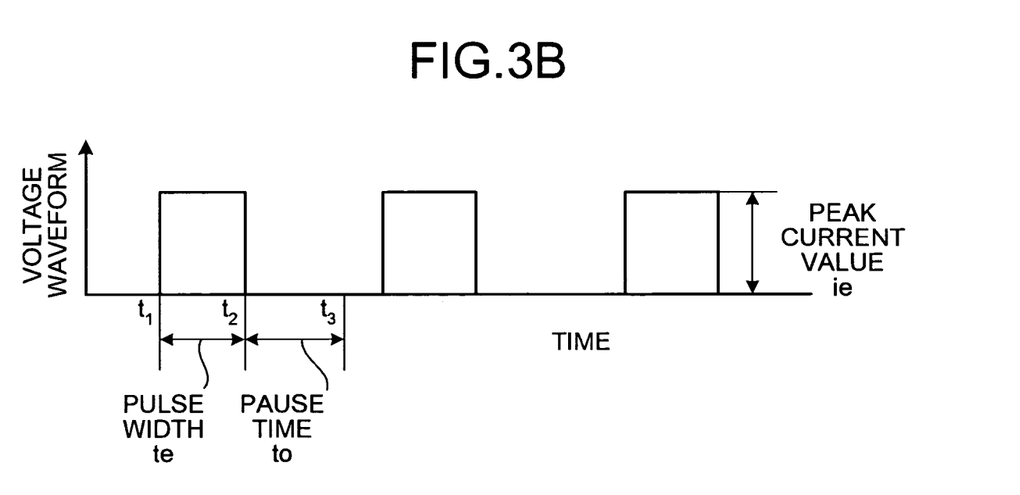
FIG. 3B is a plot of a waveform of a current flowing through an apparatus for electric discharge surface treatment during the electric discharge.

FIGS. 3A and 3B are drawings that depict conditions for electric discharge surface treatment, wherein FIG. 3A is a drawing that depicts a waveform of a voltage applied between the electrode for electric discharge surface treatment and the work at the time of electric discharge, and FIG. 3B is a drawing that depicts a waveform of a current flowing through an apparatus for electric discharge surface treatment at the time of electric discharge. As shown in FIG. 3A, a no-load voltage ui is applied at a time to between both poles and, after an electric discharge delay time td has elapsed, a current starts to flow at a time $t_1$ between both poles, thereby starting an electric discharge. At this time, a voltage is represented by a discharge voltage ue, while a flowing current is represented by a peak current value ie. Then, when the supply of voltage between both poles is stopped at a time $t_2$, the current stops flowing. The time $t_2$-the time $t_1$ is referred to as a pulse width te. The voltage waveform between the times t0 to t2 is repeatedly applied between both poles at intervals of a pause time to. In this example, pulse conditions for electric discharge are as follows: the pole on the side of the electrode for electric discharge surface treatment is taken as a minus pole, the pole on the side of the work is taken as a plus pole, the peak current value (ie) is taken as 5 to 20 amperes, and a discharge continuation time (discharge pulse width, te) is taken as 5 to 100 microseconds. With this condition being used for electric discharge surface treatment, it was possible to form a coating with a lubrication property under a high-temperature environment.

In the example of the first embodiment, the particle diameters of the Cr powder and the Co powder of the electrode material are 6 micrometers and 1 micrometers, respectively, which differ greatly from each other. Therefore, the Co powder having a smaller particle diameter is melted with a higher priority, while the Cr powder reaches on the surface of the work 202 in a state of not becoming a carbide but becoming a component of the coating. That is, with the Co powder that has a smaller particle diameter and is more prone to be melted than the Cr powder being present, the Cr powder having a larger particle diameter is less prone to be melted than the Co powder. Therefore, a coating containing uncarbonized Cr is formed on the work 202. As a result, the coating formed on the work 202 has a lubrication property with Cr becoming an oxide under a high-temperature environment.

However, the condition for the particle diameters of the powders that are components of the electrode for electric discharge surface treatment is a necessary condition for not completely melting the material not desired to be melted, but is not a sufficient condition. To form a dense, thick coating through an electric discharge surface treatment, what is required is an adequate amount of supply of the electrode material between the poles (then onto the surface of the work) by the discharge pulse, and melting and hard bonding of the supplied electrode material by the discharge pulse on the surface of the work 202. To achieve this, for the mixed powder formed of the Cr powder and the Co powder, a required hardness of the electrode for electric discharge surface treatment 201 was within a hardness range of the order of B to 9B in a pencil scratching test for coating defined under Japanese Industrial Standards (JIS) K 5600-5-4. However, the optimum value of the hardness varies depending on the particle diameter and material of the powder. For example, as the particle diameter of the powder is decreased, the optimum value of the hardness is increased. Originally, the pencil scratching test for coating under JIS K 5600-5-4 is used for evaluation of paint films, but it is also convenient for evaluation of the material having a low hardness. As a matter of course, results achieved by another hardness evaluation scheme are convertible as results of this pencil scratching test and may be used as indexes.

The scheme under JIS K 5600-5-4 can be applied to relatively soft electrodes, and is effective for cases in which the particle diameter of the powder is relatively larger, that is, on the order of 6 micrometers as in the example described in the present embodiment. However, for a powder having a small diameter, such as that on the order of 1 micrometer, the optimum hardness of the electrode is increased, thereby making it difficult to perform measurement with the use of this scheme. In such a case, another hardness measurement scheme, such as a Rockwell hardness measurement, will be effective.

Here, in the first embodiment, description has been made to the case where a Cr powder and a Co powder are mixed together. Other materials having a lubrication property at high temperatures include Mo, for example. The scheme can be similarly applied to a case of forming a coating that contains Mo. Also, in the description above, the particle diameter of the Cr powder is 6 micrometers while the particle diameter of the Co powder is 1 micrometer. However, the particle diameters may be slightly more or less than those described above. For example, the similar effects can be achieved even if the average particle diameter of the Cr powder is within a range of 4 micrometers to 10 micrometers and the particle diameter of the Co powder is within a range of equal to or less than 4 micrometers. Furthermore, when the conditions (discharge pulse conditions), such as the voltage of the power supply for electric discharge surface treatment 204, are changed, the particle diameter may take a wider range. For example, the average particle diameter of the Cr powder may be on the order of 10 micrometers. However, when the particle diameters of the powder are changed, molding conditions of the electrode for electric discharge surface treatment and electrical conditions at the time of electric discharge surface treatment (discharge pulse conditions) have to be changed.

According to the first embodiment, the particle diameter of the material not desired to be melted, such as Cr or Mo, is increased more than 3 micrometers, while the particle diameter of the material desired (allowed) to be melted, such as Co, is equal to or less than 3 micrometers, and a mixture of these materials is used to manufacture an electrode for electric discharge surface treatment, which is used for performing an electric discharge surface treatment. Therefore, the material not desired to be melted can be deposited as it is on the work for coating. As a result, a coating with a lubrication property under a high-temperature environment can be formed on the surface of the work.

In the first embodiment, description has been made to the case where, with the particle diameters of the powders forming the electrode being varied, the powder not desired to be melted is prevented from being carbonized but is used to form a coating. In a second embodiment, description is made to the case where, with the use of an easy-to-melt characteristic and a hard-to-melt characteristic unique to the powder materials, the powder not desired to be melted is prevented from being carbonized but is used to form a coating on a work.

Figure 4:
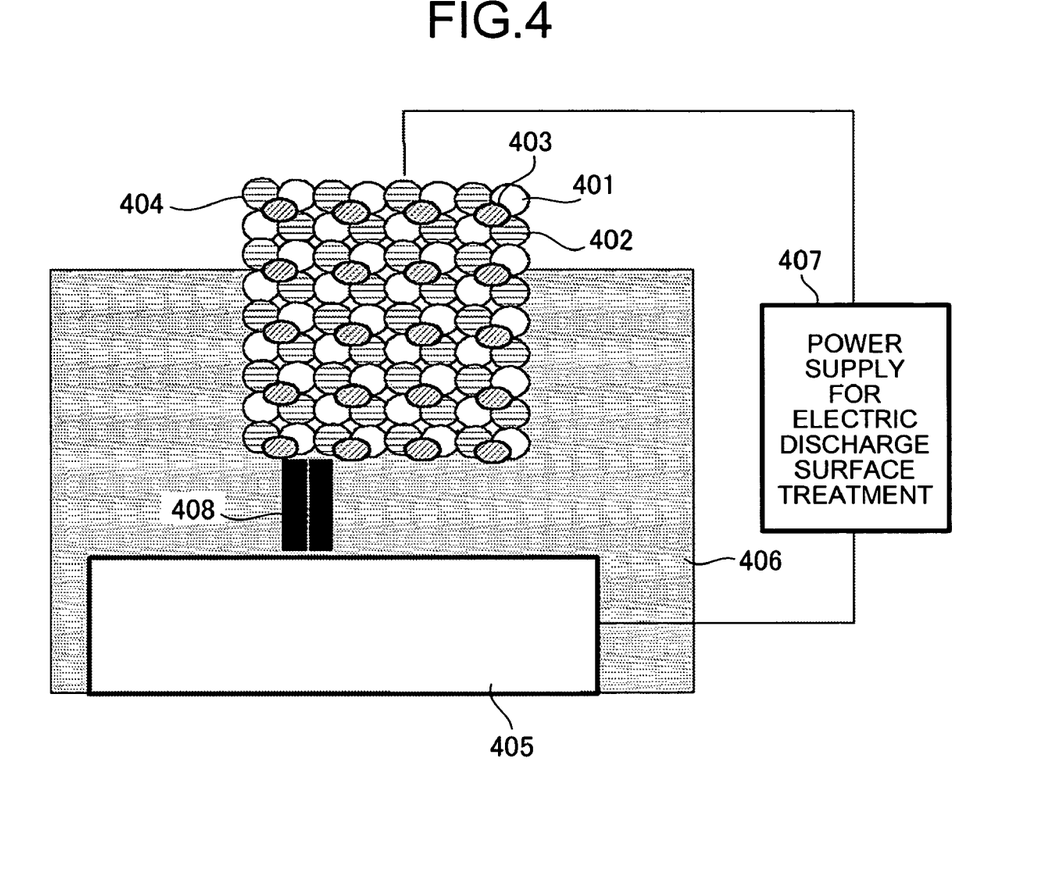
FIG. 4 is a schematic of an electric discharge surface treatment using an electrode for electric discharge surface treatment according to a second embodiment.

FIG. 4 is a drawing schematically depicting an electric discharge surface treatment using an electrode for electric discharge surface treatment according to the second embodiment. As with FIG. 2 of the first embodiment, in this FIG. 4, dielectric fluid 406 is provided with a work 405 and an electrode for electric discharge surface treatment 404 formed of a compact of powders containing a material desired to be used for forming a coating on the work 405. Between these electrode for electric discharge surface treatment 404 and work 405, a power supply for electric discharge surface treatment 407 is connected. With a pulse voltage applied from the power supply for electric discharge surface treatment 407 between the electrode for electric discharge surface treatment 404 and the work 405, an arc column 408 is generated between the electrode for electric discharge surface treatment 404 and the work 405.

In the second embodiment, description is made to an exemplary case where the electrode for electric discharge surface treatment 404 is formed of a mixture of 30 weight percent of a Cr powder (particle diameter of 1 micrometer) 401, 10 weight percent of a Ti powder (particle diameter of 1 micrometer) 402, and 60 weight percent of a Co powder (particle diameter of 1 micrometer) 403. Also, a manufacturing method of an elect 404 rode for electric discharge surface treatment is not described herein because the method of the first embodiment is also applied.

In this example, as for the diameters of the powders forming the electrode for electric discharge surface treatment 404, the Cr powder (1 micrometer) 401, the Ti powder (particle diameter of 1 micrometer) 402, and the Co powder (1 micrometer) are assumed. However, the particle diameters may be slightly less or more than those described above. For example, each particle diameter may be in a range of 1 micrometer to 10 micrometers. Furthermore, when the conditions, such as the voltage of the power supply for electric discharge surface treatment 407, are changed, the particle diameter may take a wider range. For example, the average particle diameter of each powder may be on the order of 10 micrometers. However, when the particle diameters of the powder are changed, molding conditions of the electrode for electric discharge surface treatment and electrical conditions at the time of electric discharge surface treatment (discharge pulse conditions) have to be changed.

Furthermore, although the particle diameter of the Ti powder is 1 micrometer in this example, it is normally difficult to crush a viscous material, such as Ti metal, into 1 micrometer. Therefore, in place of $TiH_2$ (titanium hydroxide) may be used. This $TiH_2$ can be easy to crush, and therefore is convenient for obtaining a powder with a small particle diameter. Also, $TiH_2$ discharges hydrogen when heated at a temperature on the order of 200 degrees Celsius to become Ti. Therefore, $TiH_2$ is mixed in advance into the electrode material, and the material is subjected to compression molding and is then heated, thereby causing the $TiH_2$ powder to become a Ti powder.

Next, with reference to FIG. 4, description is made to an electric discharge surface treatment using the electrode for electric discharge surface treatment 404 described above. When a pulse-like electric discharge is caused to take place between the electrode for electric discharge surface treatment 404 and the work 405, with its discharge energy, the electrode material forming the electrode for electric discharge surface treatment 404 is melted to be released to the surface of the work 405. The electrical material is solidified on the surface of the work 405 to become a coating.

In this example, since the electrode material contains a Ti powder, the Ti powder is prone to chemically react with a high priority even if each powder is melted or in a state of high energy. For example, when the dielectric fluid 406 is oil, the Ti powder 402 reacts with free carbon generated through degradation of the oil to generate a carbide. This is because Ti is known as an extremely-reactive material, and is thought to react first when it is placed under a chemically reactive environment, such as under an environment full of free carbon at high temperatures, for example, in a discharge arc column.

On the other hand, Cr is also a material forming a carbide, similarly to Ti, but is less reactive than Ti. Here, to cause Ti and Cr to become carbides, free carbon generated through degradation of oil, which is the dielectric fluid 406, with discharge thermal energy. However, only a limited number of types of such a carbon forming metal and carbide through discharge thermal energy is present, and such a carbon is first bonded to the material that is more prone to be carbonized (Ti). Therefore, no carbon for carbonizing the material forming a carbide is present, and that material will be left in an uncarbonized state to become a component to a coating. That is, when the Ti powder 402 that is more prone to be carbonized compared with the Cr powder 401 is present, a coating containing uncarbonized Cr can be formed on the surface of the work 405. The coating containing such Cr is known to have a lubrication property with Cr becoming an oxide under a high-temperature environment. To achieve a lubrication property at high temperatures, Cr is preferably as it is rather than in the form of chromium carbide. For this, it is required not to carbonize the Cr powder with discharge energy.

Through experiments by the Inventors, the following has been revealed as to the state of the coating when the material forming a carbide is contained in the electrode. First, as an example for comparison, an electrode for electric discharge surface treatment containing Cr but not containing Ti was used for electric discharge surface treatment. When the coating formed on the work 405 was analyzed through X-ray diffraction, a high peak of chromium carbide was observed. Next, as an example of the second embodiment, the electrode for electric discharge surface treatment 404 containing both Cr and Ti was used for electric discharge surface treatment. When the coating formed on the work 405 was analyzed through X-ray diffraction, the peak of chromium carbide was low, and a high peak of titanium carbide was observed instead.

With the above, according to the second embodiment, if Ti, which is a material that is more prone to be carbonized than Cr, and Cr are contained as components of the electrode for electric discharge surface treatment, carbonization of Cr can be prevented at the time of electric discharge surface treatment, thereby making it possible to form a coating with a lubrication property under a high-temperature environment.

Here, in the second embodiment, Cr has been described as a material with a lubrication property under a high-temperature environment. Another such material is Mo, for example. The scheme can be similarly applied to a case of forming a coating that contains Mo or the like.

In the second embodiment, description has been made to the case where a material not desired to be carbonized (Cr powder) and a material more prone to be carbonized (Ti powder) than the former material are mixed together. In a third embodiment, description is made to the case where a material not desired to be carbonized (Cr) is coated with a material (Ti) that is more prone to be carbonized than the former material, thereby preventing carbonization of the material not desired to be carbonized.

Figure 5:
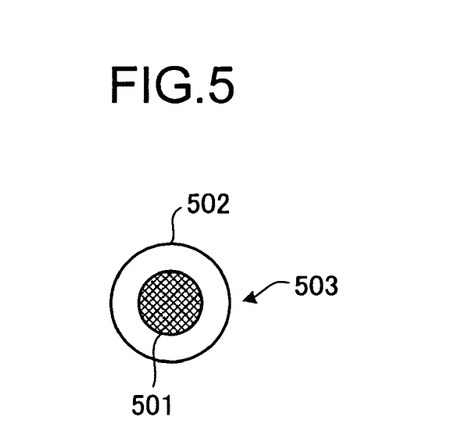
FIG. 5 is a cross-section of a Ti-coated Cr powder.

In the following description, it is assumed that 60 weight percent of a Co powder and 40 weight percent of a Ti-coated Cr powder are mixed together to manufacture an electrode for electric discharge surface treatment. Also, the Ti-coated Cr powder is formed by coating a Cr powder with Ti at a ratio of 40 weight percent of Ti and 60 weight percent of Cr. FIG. 5 is a drawing schematically depicting a section of the Ti-coated Cr powder. As shown in the drawing, a Ti-coated Cr powder 503 has its surface of a Cr powder 501 coated with Ti 502. Here, schemes for coating the surface of the Cr powder 501 with Ti 502 include schemes such as plating and Physical Vapor Deposition (PVD). This Ti-coated Cr powder 503 is used as a component of the electrode for electric discharge surface treatment.

Figure 6:
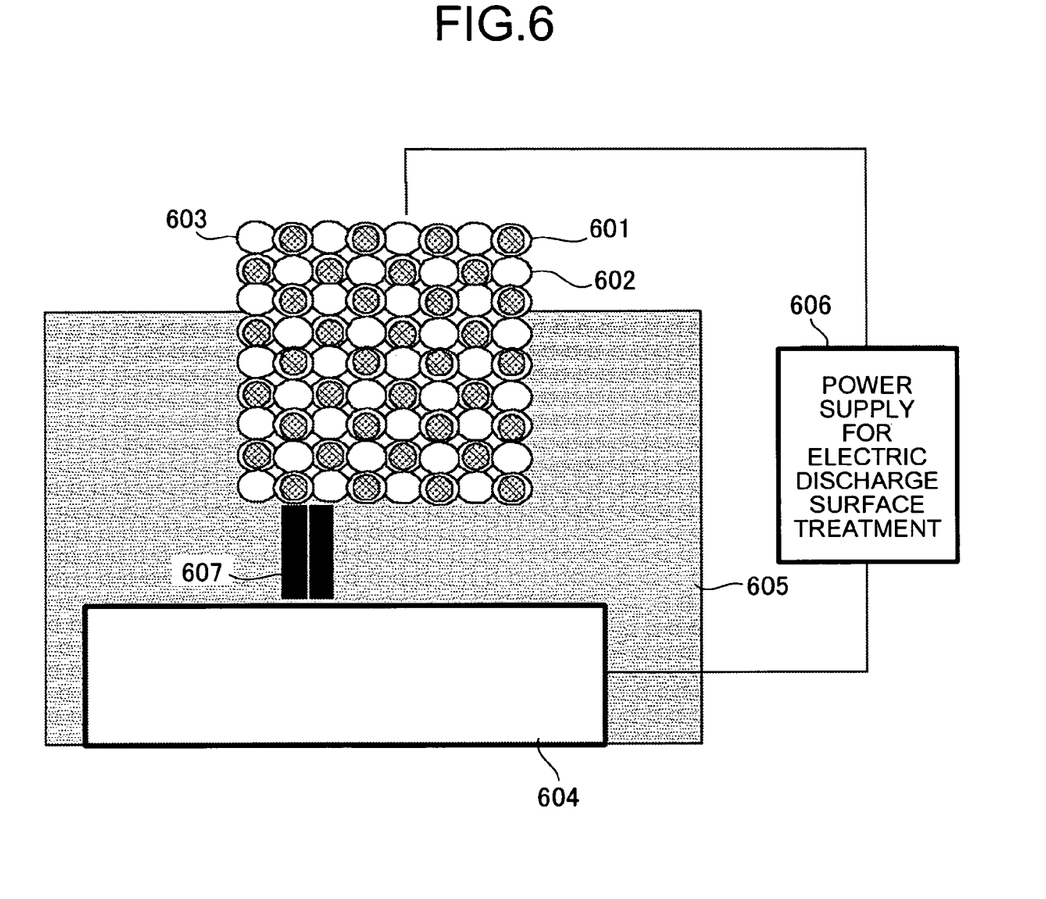
FIG. 6 is a schematic of an electric discharge surface treatment using an electrode for electric discharge surface treatment according to a third embodiment.

FIG. 6 is a drawing schematically depicting an electric discharge surface treatment using the electrode for electric discharge surface treatment according to the third embodiment. As with FIG. 2 of the first embodiment, in this FIG. 6, dielectric fluid 605 is provided with a work 604 and an electrode for electric discharge surface treatment 603 formed of a compact of powders containing a material desired to be used for forming a coating on the work 604. Between these electrode for electric discharge surface treatment 603 and work 604, a power supply for electric discharge surface treatment 606 is connected. With a pulse voltage applied from the power supply for electric discharge surface treatment 606 between the electrode for electric discharge surface treatment 603 and the work 604, an arc column 607 is generated between the electrode for electric discharge surface treatment 603 and the work 604.

In the third embodiment, description is made to an exemplary case where the electrode for electric discharge surface treatment 603 is formed of a mixture of a Ti-coated Cr powder (particle diameter on the order of 6 micrometers) 601 and a Co powder (particle diameter of 1 micrometer) 602. Also, a manufacturing method of an electrode for electric discharge surface treatment 603 is not described herein because the method of the first embodiment is also applied.

Next, with reference to FIG. 6, description is made to an electric discharge surface treatment using the electrode for electric discharge surface treatment 603 described above. When a pulse-like electric discharge is caused to take place between the electrode for electric discharge surface treatment 603 and the work 604, with its discharge energy, the electrode material forming the electrode for electric discharge surface treatment 603 is melted to be released to the surface of the work 604. The electrical material is solidified on the surface of the work 604 to become a coating. When the electrode material becomes at a high energy state when melted, and therefore it becomes chemically reactive. For example, when the dielectric fluid 605 is oil, the electrode material reacts with carbon generated by dissolving the oil, thereby causing Ti to form titanium carbide and Cr to form chromium carbide.

When an electric discharge surface treatment is performed in the dielectric fluid 605 containing carbon, such as oil to form a coating on the work 604, even if the electrode 603 contains a material forming a carbide (for example, Cr), the electrode 603 further contains another material that is more prone to form a carbide (such as Ti) than the former material, thereby suppressing carbonization of the material forming a carbide (such as Cr). In particular, as in this example, not mixing a material that contains a Cr powder and a Ti powder but coating a material not desired to be carbonized (a material forming a carbide) with a material that is more prone forming a carbide than the former material is very effective in preventing carbonization of the material not desired to be carbonized.

This effect is more specifically described. In the third embodiment, with the Cr powder being coated with Ti, a probability that the Cr powder will come in contact with free carbon generated by dissolving oil, which is the dielectric fluid 605, with discharge thermal energy is decreased. Also, Ti is mixed to prevent free carbon generated by dissolving oil, which is the dielectric fluid 605, with discharge thermal energy from coming in contact with Cr, merely mixing a material that contains a Cr powder and a Ti powder cannot sufficiently prevent carbonization of Cr because no Ti powder may be present near the Cr powder. However, if the Cr powder is coated with Ti, Ti, which is more prone to be carbonized than Cr, is always present near (that is, on the surface of) the Cr powder. This Ti first consumes free carbon approaching the Cr powder, thereby preventing the Cr powder from being carbonized. This can be confirmed by the fact that, when an electric discharge surface treatment is performed with the electrode for electric discharge surface treatment 603 containing the Ti-coated Cr powder 601 and a coating formed on the work 604 is then analyzed through X-ray diffraction, no high peak of chromium carbide is observed.

With the above, according to the third embodiment, if a powder generated by coating the surface of a Cr powder, which is not desired to be carbonized, with Ti, which is more prone to be carbonized than the Cr powder, is contained as a component of the electrode for electric discharge surface treatment, carbonization of Cr can be prevented at the time of electric discharge surface treatment, thereby making it possible to form a coating with a lubrication property under a high-temperature environment.

Here, in the third embodiment, Cr has been described as a material with a lubrication property under a high-temperature environment. Another such material is Mo, for example. The scheme can be similarly applied to a case of forming a coating that contains Mo or the like.

In a fourth embodiment, description is made to the case where an alloy powder is used for an electrode for electric discharge surface treatment by using the fact that, when a material forming a carbide is not contained as a single powder, but as an alloy powder with another metal that is less prone to form a carbide, the material forming a carbide is less prone to be carbonized.

Figure 7:
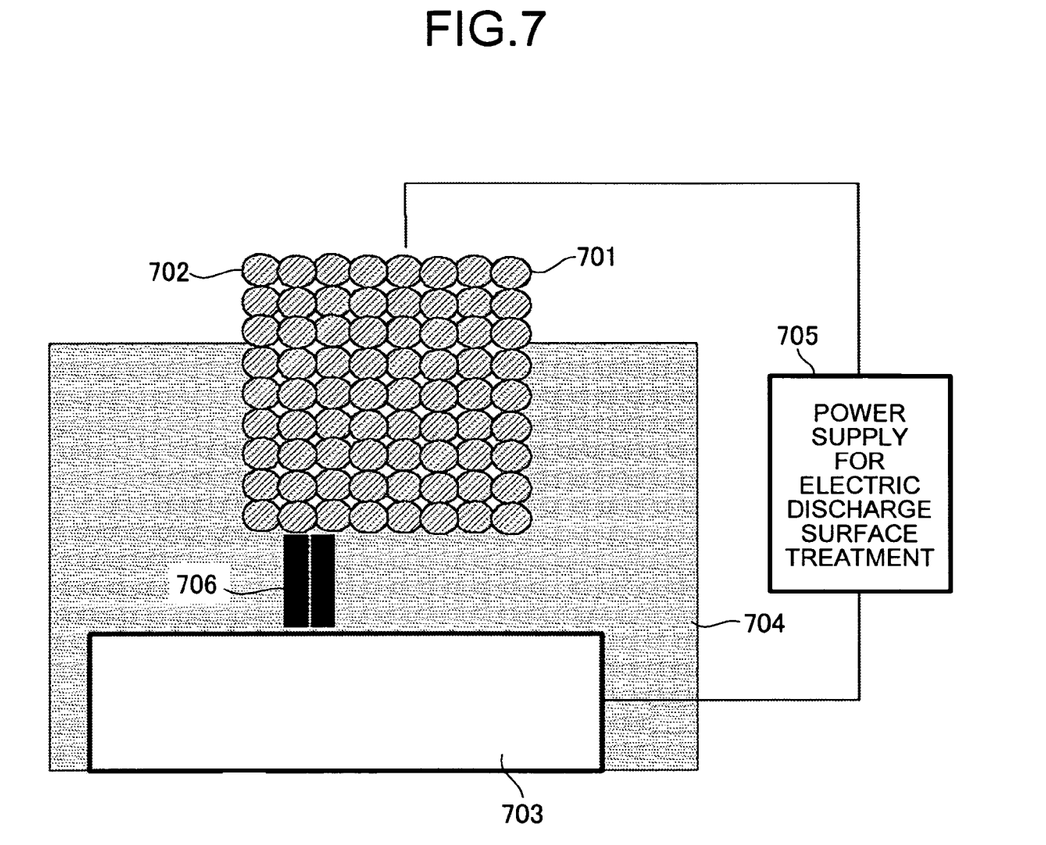
FIG. 7 is a schematic of an electric discharge surface treatment using an electrode for electric discharge surface treatment according to a fourth embodiment.

FIG. 7 is a drawing schematically depicting an electric discharge surface treatment using an electrode for electric discharge surface treatment according to the fourth embodiment. As with FIG. 2 of the first embodiment, in this FIG. 7, dielectric fluid 704 is provided with a work 703 and an electrode for electric discharge surface treatment 702 formed of a compact of powders containing a material desired to be used for forming a coating on the work 703. Between these electrode for electric discharge surface treatment 702 and work 703, a power supply for electric discharge surface treatment 705 is connected. With a pulse voltage applied from the power supply for electric discharge surface treatment 705 between the electrode for electric discharge surface treatment 702 and the work 703, an arc column 706 is generated between the electrode for electric discharge surface treatment 702 and the work 703. The electrode for electric discharge surface treatment 702 is formed by molding a powder 701 of an alloy with Co as the main ingredient and also containing Cr.

The components of the alloy used herein are "20 weight percent of Cr, 10 weight of percent Ni (nickel), 15 weight percent of W, and Co being the rest", but may be "25 weight percent of Cr, 10 weight percent of Ni, 7 weight percent of W, and Co being the rest", "28 weight percent of Mo, 17 weight percent of Cr, 3 weight percent of Si, and Co being the rest", "15 weight percent of Cr, 8 weight percent of Fe (iron), and Ni being the rest, "21 weight percent of Cr, 9 weight percent of Mo, 4 weight percent of Ta, and Ni being the rest", or "19 weight percent of Cr, 53 weight percent of Ni, 3 weight percent of Mo, 5 weight percent of (Cd (cadmium)+Ta), 0.8 weight percent of Ti, 0.6 weight percent of Al (aluminum), and Fe being the rest".

When a pulse-like electric discharge is caused to take place between the electrode for electric discharge surface treatment 702 and the work 703, with its discharge energy, the electrode material forming the electrode for electric discharge surface treatment 702 is melted to be released to the surface of the work 703. The electrical material is solidified on the surface of the work 703 to become a coating. When the electrode material becomes at a high energy state when melted, and therefore it becomes chemically reactive. For example, when the dielectric fluid 704 is oil, the electrode material reacts with carbon generated by dissolving the oil, thereby causing Cr to form chromium carbide and Mo to form molybdenum carbide. However, if such a material forming a carbide (such as Cr or Mo) is less prone to form a carbide if this material is contained as a powder of an alloy with another material that is less prone to form a carbide (Co).

The reason for the above is thought to be as follows. Even if a material forming a carbide (for example, Cr) is contained in the electrode, this material is not contained as a single powder but as a powder of an alloy with another material that is less prone to form a carbide (Co). This decreases a probability that the material forming a carbide will come in contact with free carbon generated by dissolving oil, which is the dielectric fluid 704, with discharge thermal energy. That is, according to the fourth embodiment, an electric discharge surface treatment is performed by using the electrode for electric discharge surface treatment 702 manufactured by the powder 701 of the alloy formed by dissolving Cr, which is a material forming a carbide, into Co, which does not form a carbide. With this, a coating containing uncarbonized Cr is formed on the work 703. Then, Cr in this coating becomes an oxide under a high-temperature environment, thereby achieving a lubrication property. This can be confirmed by the fact that, when an electric discharge surface treatment is performed with the electrode for electric discharge surface treatment containing the alloy powder including Cr and a coating formed on the work 703 is then analyzed through X-ray diffraction, no high peak of chromium carbide is observed. Similarly, when an electric discharge surface treatment is performed with the electrode for electric discharge surface treatment containing the alloy powder including Mo and a coating formed on the work is then analyzed through X-ray diffraction, no high peak of molybdenum carbide is observed.

With the above, according to the fourth embodiment, if a powder of an alloy of a material that is prone to form a carbide, such as Cr or Mo, and a material that is less prone to form a carbide, such as Co, is contained as a component of the electrode for electric discharge surface treatment, carbonization of Cr or Mo can be prevented at the time of electric discharge surface treatment, thereby making it possible to form a coating of such a material. As a result, the coating can achieve a lubrication property under a high-temperature environment with Cr or Mo being oxidized.

In the first through fourth embodiments described above, Co is mixed as an electrode component because this is effective for increasing the thickness of the coating to be formed on the work. The reason for this is as follows. In the electrode for electric discharge surface treatment formed only of a material that is prone to form a carbide, the coating formed on the work becomes in a state of ceramic carbide, which degrades thermal conductivity of the coating and promotes removal of the coating through electric discharge. With Co, which is less prone to form a carbide, being mixed as a component, degradation of thermal conductivity of the coating formed on the work can be prevented, and the thickness of the coating can be increased. Examples of materials with similar effects as those of Co are Ni and Fe.

Also, in the first through fourth embodiments described above, an electric discharge surface treatment is performed in dielectric fluid, but may be performed in air. In this case, to make a component of the coating desired to be formed on the work less chemically reactive with a component of the air, in the electrode for electric discharge surface treatment, a diameter of a powder of the component of the coating is larger than 3 micrometers and a component more chemically reactive with a component of the air than the former component is smaller than 3 micrometers. Also, in the electrode for electric discharge surface treatment, a component more chemically reactive with a component of the air than the component of the coating desired to be formed on the work may be contained as a powder or may be used for coating the surface of the component of the coating. Furthermore, a powder of an alloy of the component of the coating desired to be formed on the work and the component less chemically reactive with a component of the air may be used for forming an electrode for electric discharge surface treatment.

Still furthermore, in the first through fourth embodiments described above, as the method of molding an electrode for electric-discharge surface treatment, the method is described in which the powder is formed by compression molding with press. However, the method of manufacturing an electrode for electric discharge surface treatment is not restricted to compression molding, but may be any other forming method as long as the powder is molded. Examples of the method of forming an electrode for electric discharge surface treatment include, in addition to compression molding with press or the like as described above, slip casting, Metal Injection Molding (MIM), spraying, and molding with nanopowder-entrained jet stream. Here, slip casting is a method of molding a powder by putting the powder dispersed in a solvent into a porous cast, such as a plaster mold, and then removing the solvent. MIM is a molding method of injecting a binder-kneaded powder into a heated mold. Furthermore, spraying is a method of spraying a heated powder to mold a partially-bound powder. The exemplary methods described above are different from each other in the molding method, but the object of molding a powder is the same. Therefore, any of these methods can be used as a method of forming an electrode for electric discharge surface treatment as long as a desired binding state of the powder is obtained.

As has been described above, according to the present invention, a desired electrode material can be prevented from being melted by discharge energy, and the unmelted material can be contained as a component of the coating formed on the surface of the work. As a result, a coating with a lubrication property under a high-temperature environment can be formed.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An electrode for electric discharge surface treatment, the electrode being a green compact formed by molding a metal powder, a metal compound powder, or a ceramic powder, and used for electric discharge surface treatment in which an electric discharge is generated between the electrode and a work in dielectric fluid or air to form by the electric discharge energy on a surface of the work a coat of a material of the electrode or of a substance resulting from reaction of the material due to the electric discharge energy, wherein
the material of the electrode includes a first material which will remain substantially uncarbonized and a second material to be substantially melted, and a particle diameter of the first material which will remain substantially uncarbonized is larger than a particle diameter of the second material to be substantially melted, so as to prevent a carbonization of the first material, leaving the first material deposited as it is on the work for coating, and to obtain a lubrication property when the first material is oxidized under a high-temperature environment, wherein
the first material not desired to be carbonized includes at least one of Cr, Mo, and an alloy including any one of Cr and Mo.

2. The electrode according to claim 1, wherein
an average particle diameter of the at least one of Cr, Mo, and the alloy is within a range of 4 micrometers to 10 micrometers.

3. The electrode according to claim 1, wherein
the second material desired to be melted is any one of a metallic material that does not form a carbide and a metallic material that is less prone to form a carbide.

4. An electrode for electric discharge surface treatment, the electrode being a green compact formed by molding a metal powder, a metal compound powder, or a ceramic powder, and used for electric discharge surface treatment in which an electric discharge is generated between the electrode and a work in dielectric fluid or air to form by the electric discharge energy on a surface of the work a coat of a material of the electrode or of a substance resulting from reaction of the material due to the electric discharge energy, wherein
the electrode includes a powder of a first material not desired to be carbonized although the first material can be carbonized and a second material that is more prone to be carbonized than the first material not desired to be carbonized, so as to prevent a carbonization of the first material not desired to be carbonized, leaving the first material deposited as it is on the work for coating, and to obtain a lubrication property when the material is oxidized under a high-temperature environment, wherein
the first material not desired to be carbonized includes at least one of Cr, Mo, and an alloy including any one of Cr and Mo, and
the second material that is more prone to be carbonized than the first material not desired to be carbonized is Ti.

5. An electrode for electric discharge surface treatment, the electrode being a green compact formed by molding a metal powder, a metal compound powder, or a ceramic powder, and used for electric discharge surface treatment in which an electric discharge is generated between the electrode and a work in dielectric fluid or air to form by the electric discharge energy on a surface of the work a coat of a material of the electrode or of a substance resulting from reaction of the material due to the electric discharge energy, wherein
the electrode includes a powder of a first material not desired to be carbonized that is coated with a second material that is more prone to be carbonized than the first material not desired to be carbonized, so as to prevent a carbonization of the first material not desired to be carbonized, leaving the first material deposited as it is on the work for coating, and to obtain a lubrication property when the first material is oxidized under a high-temperature environment.

6. The electrode according to claim 5, wherein
the first material not desired to be carbonized includes at least one of Cr, Mo, and an alloy including any one of Cr and Mo, and
the second material that is more prone to be carbonized than the material not desired to be carbonized is Ti.

7. An electrode for electric discharge surface treatment, the electrode being a green compact formed by molding a metal powder, a metal compound powder, or a ceramic powder, and used for electric discharge surface treatment in which an electric discharge is generated between the electrode and a work in dielectric fluid or air to form by the electric discharge energy on a surface of the work a coat of a material of the electrode or of a substance resulting from reaction of the material due to the electric discharge energy, wherein
the electrode includes an alloy powder that is formed with a first material not desired to be carbonized and a second material that is less prone to be carbonized, so as to prevent a carbonization of the first material not desired to be carbonized, leaving the first material deposited as it is on the work for coating, and to obtain a lubrication property when the first material is oxidized under a high-temperature environment
the first material not desired to be carbonized includes at least on of Cr, Mo, and an alloy including any one of Cr and Mo.

8. The electrode according to claim 7, wherein the second material that is less prone to be carbonized includes Co, Ni, and Fe.

9. An apparatus for electric discharge surface treatment in which an electrode being a green compact formed by molding a metal powder, a metal compound powder, or a ceramic powder and a work on which a coating is formed are arranged in dielectric fluid or air, and a power supply device electrically connected to the electrode and the work causes a pulsed electric discharge between the electrode and the work to form by the electric discharge energy on a surface of the work a coat of a material of the electrode or of a substance resulting from reaction of the material due to the electric discharge energy, wherein
the material of the electrode includes a first material which will remain substantially uncarbonized and a second material to be substantially melted, and a particle diameter of the first material which will remain substantially uncarbonized is larger than a particle diameter of the second material to be substantially melted, so as to prevent a carbonization of the first material, leaving the first material deposited as it is on the work for coating, and to obtain a lubrication property when the first material is oxidized under a high-temperature environment the first material not desired to be carbonized includes at least one of Cr, Mo, and an alloy including any one of Cr and Mo.

10. The apparatus according to claim 9, wherein an average particle diameter of the at least one of Cr, Mo, and the alloy is within a range of 4 micrometers to 10 micrometers.

11. The apparatus according to claim 9, wherein the second material desired to be melted is any one of a metallic material that does not form a carbide and a metallic material that is less prone to form a carbide.

12. An apparatus for electric discharge surface treatment in which an electrode being a green compact formed by molding a metal powder, a metal compound powder, or a ceramic powder and a work on which a coating is formed are arranged in dielectric fluid or air, and a power supply device electrically connected to the electrode and the work causes a pulsed electric discharge between the electrode and the work to form by the electric discharge energy on a surface of the work a coat of a material of the electrode or of a substance resulting from reaction of the material due to the electric discharge energy, wherein the electrode includes a powder of a first material to be substantially uncarbonized although the material can be carbonized and a second material that is more prone to be carbonized than the first material not desired to be carbonized, so as to prevent a carbonization of the first material not desired to be carbonized, leaving the first material deposited as it is on the work for coating, and to obtain a lubrication property when the first material is oxidized under a high-temperature environment, wherein the first material not desired to be carbonized includes at least one of Cr, Mo, and an alloy including any one of Cr and Mo, and the second material that is more prone to be carbonized than the first material not desired to be carbonized is Ti.

13. An apparatus for electric discharge surface treatment in which an electrode being a green compact formed by molding a metal powder, a metal compound powder, or a ceramic powder and a work on which a coating is formed are arranged in dielectric fluid or air, and a power supply device electrically connected to the electrode and the work causes a pulsed electric discharge between the electrode and the work to form by the electric discharge energy on a surface of the work a coat of a material of the electrode or of a substance resulting from reaction of the material due to the electric discharge energy, wherein the electrode includes a powder of a first material not desired to be carbonized that is coated with a second material that is more prone to be carbonized than the first material not desired to be carbonized, so as to prevent a carbonization of the first material not desired to be carbonized, leaving the first material deposited as it is on the work for coating, and to obtain a lubrication property when the first material is oxidized under a high-temperature environment.

14. The apparatus according to claim 13, wherein the first material not desired to be carbonized includes at least one of Cr, Mo, and an alloy including any one of Cr and Mo, and the second material that is more prone to be carbonized than the first material not desired to be carbonized is Ti.

15. An apparatus for electric discharge surface treatment in which an electrode being a green compact formed by molding a metal powder, a metal compound powder, or a ceramic powder and a work on which a coating is formed are arranged in dielectric fluid or air, and a power supply device electrically connected to the electrode and the work causes a pulsed electric discharge between the electrode and the work to form by the electric discharge energy on a surface of the work a coat of a material of the electrode or of a substance resulting from reaction of the material due to the electric discharge energy, wherein the electrode includes an alloy powder that is formed with a first material not desired to be carbonized and a second material that is less prone to be carbonized than the first material, so as to prevent a carbonization of the first material not desired to be carbonized, leaving the first material deposited as it is on the work for coating, and to obtain a lubrication property when the first material is oxidized under a high-temperature environment, wherein the first material not desired to be carbonized includes at least one of Cr, Mo, and an alloy including any one of Cr and Mo.

16. The apparatus according to claim 15, wherein the second material that is less prone to be carbonized includes Co, Ni, and Fe.

* * * * *